(12) United States Patent
Carter, II

(10) Patent No.: US 11,068,711 B2
(45) Date of Patent: Jul. 20, 2021

(54) SYSTEMS AND METHODS OF BIOMETRIC ACQUISITION USING POSITIVE OPTICAL DISTORTION

(71) Applicant: EYELOCK LLC, New York, NY (US)

(72) Inventor: Thomas E. Carter, II, Austin, TX (US)

(73) Assignee: Eyelock LLC, New York, NY (US)

( * ) Notice: Subject to any disclaimer, the term of this patent is extended or adjusted under 35 U.S.C. 154(b) by 0 days.

(21) Appl. No.: 16/115,768

(22) Filed: Aug. 29, 2018

(65) Prior Publication Data

US 2019/0065846 A1 Feb. 28, 2019

Related U.S. Application Data

(60) Provisional application No. 62/552,852, filed on Aug. 31, 2017.

(51) Int. Cl.
*G06K 9/00* (2006.01)
*H04N 5/232* (2006.01)
(Continued)

(52) U.S. Cl.
CPC ..... *G06K 9/00604* (2013.01); *G02B 13/0015* (2013.01); *G02B 27/0025* (2013.01); *G06K 9/0061* (2013.01); *G06T 5/002* (2013.01); *H04N 5/2253* (2013.01); *H04N 5/2254* (2013.01); *H04N 5/23229* (2013.01); *G06K 9/00617* (2013.01); *G06K 9/3208* (2013.01)

(58) Field of Classification Search
None
See application file for complete search history.

(56) References Cited

U.S. PATENT DOCUMENTS 4,641,349 A 2/1987 Flom et al.
5,259,040 A 11/1993 Hanna
(Continued)

FOREIGN PATENT DOCUMENTS

WO WO-2010/062371 6/2010
WO WO-2011/093538 8/2011

OTHER PUBLICATIONS

B. Galvin, et al., Recovering Motion Fields: An Evaluation of Eight Optical Flow Algorithms, Proc. of the British Machine Vision Conf. (1998) (pp. 195-204).
(Continued)

*Primary Examiner* — Kate H Luo
(74) *Attorney, Agent, or Firm* — Foley & Lardner LLP

(57) ABSTRACT

The present disclosure describes systems and methods for acquiring a biometric image. A biometric camera system can position a lens of a biometric camera between a pixel array of the biometric camera and an iris. The pixel array can acquire an image of the iris using light reflected from the iris and transmitted through the lens of the biometric camera. The lens can increase a pixels per iris (PPi) value of the image of the iris acquired by the pixel array, by applying optical positive distortion to the light reflected from the iris when the light is optically directed through the lens. A processor can provide a biometric image for biometric matching, by image-processing the acquired image of the iris having the increased PPi value, with an inverse function of the optical positive distortion.

18 Claims, 9 Drawing Sheets

(51) Int. Cl.
  *H04N 5/225* (2006.01)
  *G06T 5/00* (2006.01)
  *G02B 13/00* (2006.01)
  *G02B 27/00* (2006.01)
  *G06K 9/32* (2006.01)

(56) References Cited

U.S. PATENT DOCUMENTS

| | | |
|---|---|---|
| 5,291,560 A | 3/1994 | Daugman |
| 5,488,675 A | 1/1996 | Hanna |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 9,465,988 B1* | 10/2016 | Marason ............ G06K 9/00604 |
| 2004/0017491 A1 | 1/2004 | Stavely |
| 2005/0084137 A1 | 4/2005 | Kim et al. |
| 2006/0074986 A1 | 4/2006 | Mallalieu et al. |
| 2007/0211922 A1 | 9/2007 | Crowley et al. |
| 2009/0074256 A1 | 3/2009 | Haddad |
| 2009/0097715 A1 | 4/2009 | Cottard et al. |
| 2009/0122162 A1 | 5/2009 | Shabtay et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0074477 A1 | 3/2010 | Fujii et al. |
| 2010/0110374 A1 | 5/2010 | Raguin et al. |
| 2010/0127826 A1 | 5/2010 | Saliba et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0240223 A1 | 9/2012 | Tu |
| 2012/0257797 A1 | 10/2012 | Leyvand et al. |
| 2014/0226876 A1* | 8/2014 | Savvides ............ G06K 9/00604 382/117 |
| 2015/0098630 A1* | 4/2015 | Perna ................. G07C 9/00563 382/117 |
| 2015/0212289 A1* | 7/2015 | Matsuo .................. G03B 13/06 348/360 |
| 2016/0117544 A1* | 4/2016 | Hoyos ................ G06K 9/00604 348/78 |
| 2016/0188974 A1* | 6/2016 | Mullin ............... G06K 9/00885 348/78 |
| 2017/0070732 A1* | 3/2017 | Roulet ................. H04N 17/002 |
| 2017/0366761 A1* | 12/2017 | Dainty ............... G06K 9/00597 |

OTHER PUBLICATIONS

European Search Report application No. EP 18191541 dated Feb. 5, 2019.

Examiner's Report Issued on U.S. Pat. No. 3,015,802 dated Apr. 23, 2019.

Foreign Action other than Search Report on CA 3015802 dated Apr. 3, 2020.

J. R. Bergen, et al., Hierarchical Model-Based Motion Estimation, European Conf. on Computer Vision (1993) (pp. 237-252).

K. Nishino, et al., The World in an Eye, IEEE Conf. on Pattern Recognition, vol. 1, at pp. 444-451 (Jun. 2004).

R. Kumar, et al., Direct recovery of snape from multiple views: a parallax based approach, 12th IAPR Int'l Conf. on Pattern Recognition (1994)(pp. 1-5).

\* cited by examiner

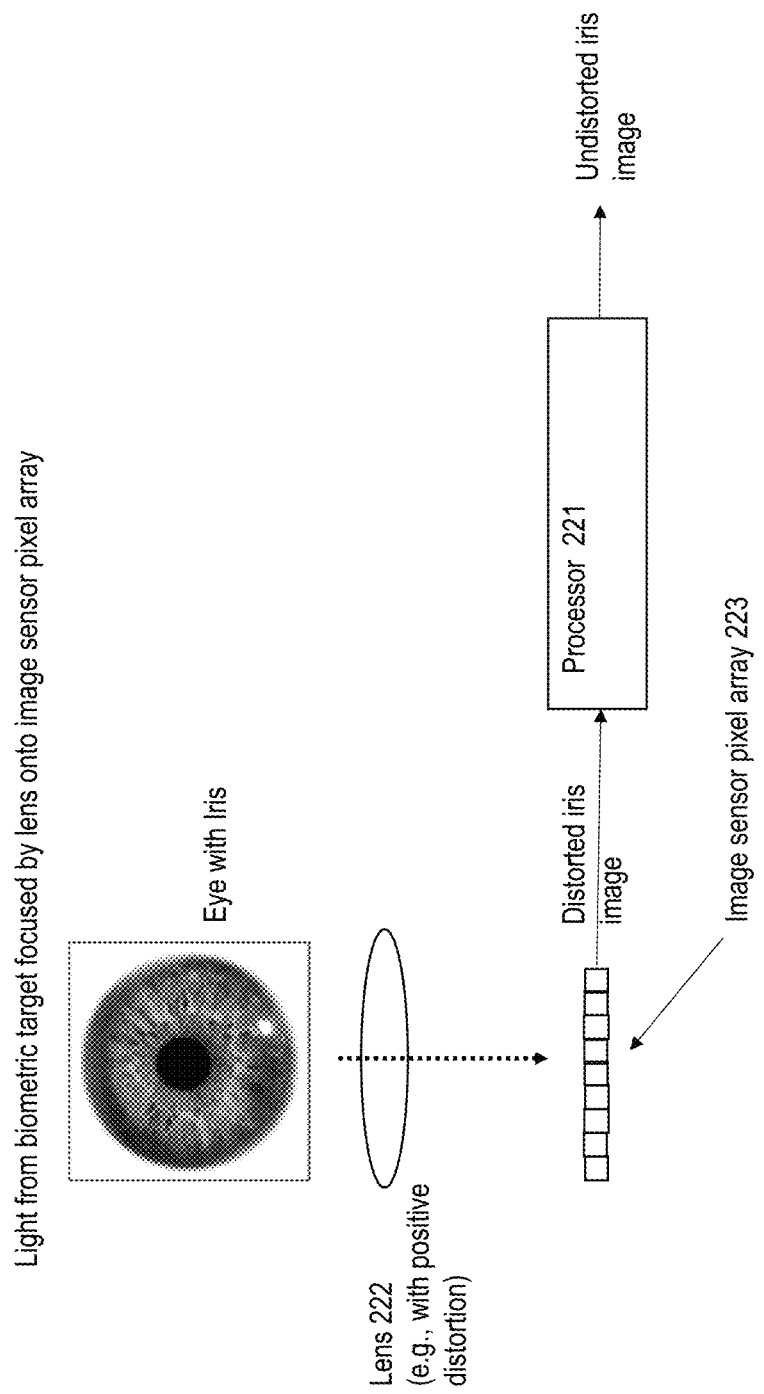

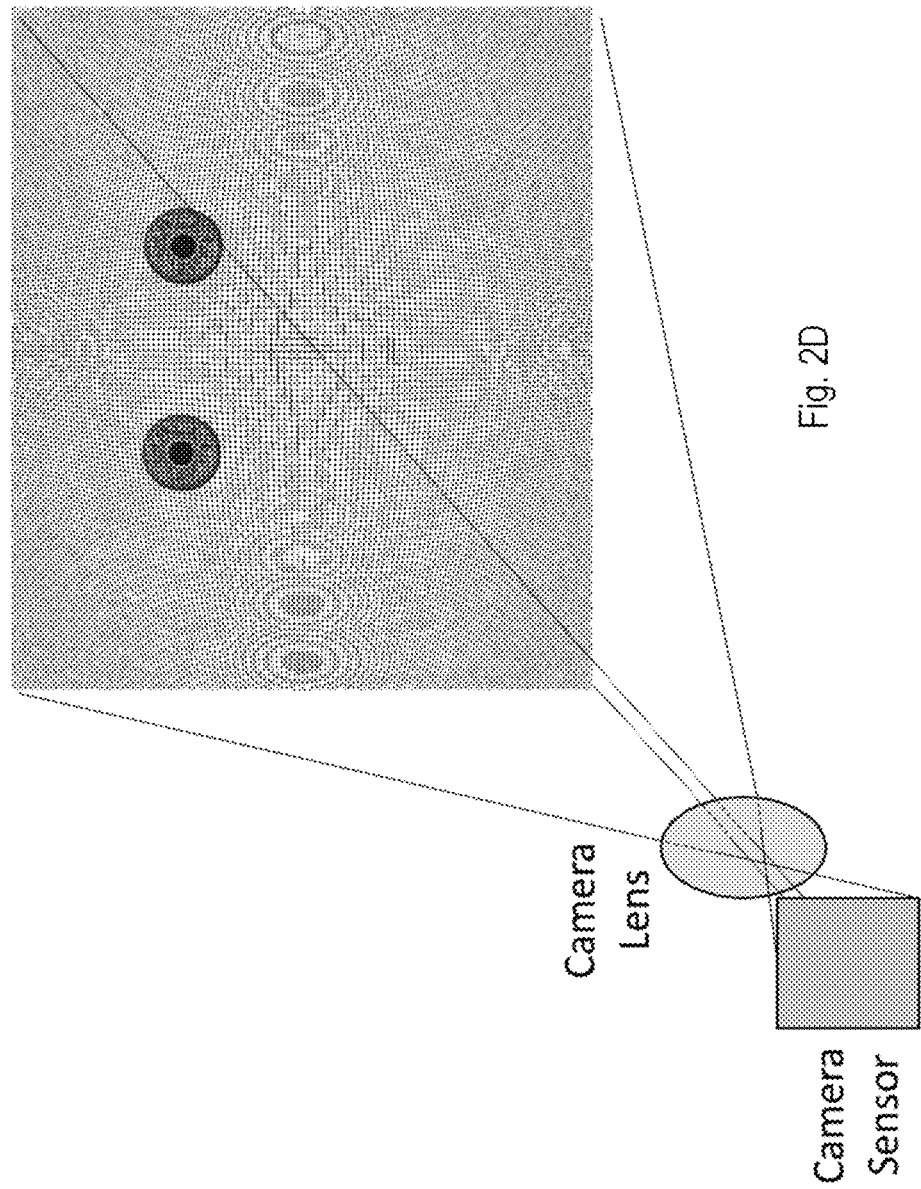

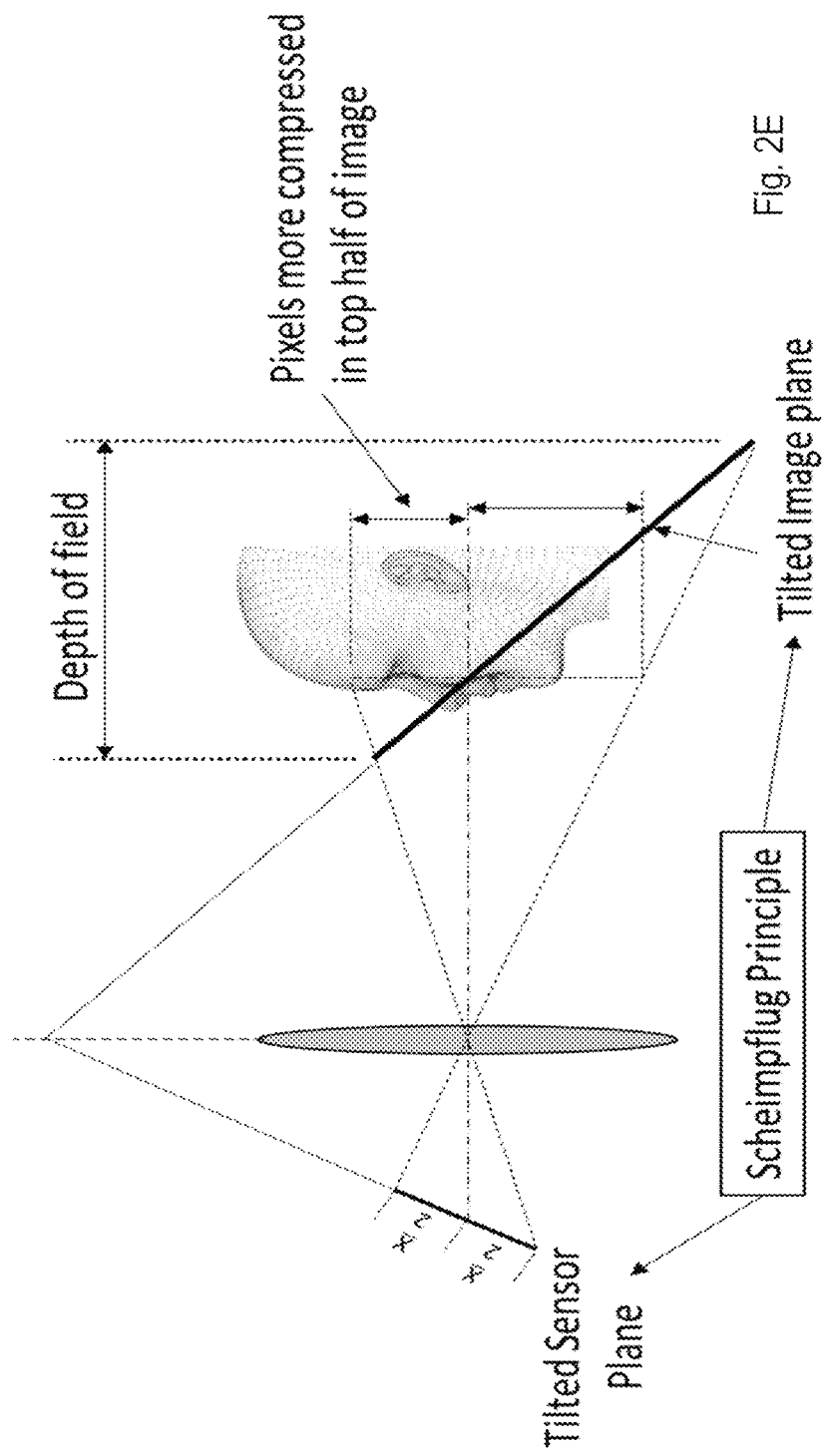

SYSTEMS AND METHODS OF BIOMETRIC ACQUISITION USING POSITIVE OPTICAL DISTORTION

CROSS REFERENCE TO RELATED APPLICATIONS

This application claims the benefit of and priority to U.S. Provisional Application Ser. No. 62/552,852, filed Aug. 31, 2017, entitled "SYSTEMS AND METHODS OF BIOMETRIC ACQUISITION USING POSITIVE OPTICAL DISTORTION". The entire content of the foregoing is incorporated herein by reference for all purposes.

FIELD OF THE DISCLOSURE

This disclosure generally relates to systems and methods for biometric acquisition, including but not limited to systems and methods for acquiring a biometric image using optical distortion.

BACKGROUND

The diversity and number of computing devices is increasing exponentially. For example, there are portable devices such as smart phones, laptops and tablets, and traditional desk-bound computing platforms. Some of these devices may include integrated cameras, but these cameras are often sub-optimal for acquiring iris biometric data for authentication purposes, because of limitations in working distances and depth of field for instance.

SUMMARY

Some embodiments of the present systems and methods relate generally to apparatuses, systems and methods for biometric acquisition using positive optical distortion. Some embodiments of the present systems and methods use positive optical distortion in a lens that is part of an imaging device. The lens may support optical paths for light rays incident from a user (e.g., an iris of the user) that enter the camera module, such that the light rays are directed differently in a manner defined by the positive distortion, to an image sensor. For instance, and in some embodiments, the lens is manufactured as a solid piece of acrylic glass or other material with an entrance surface for incident rays to enter, and an exit surface for coupling the directed rays to an image sensor which comprises an array of sensor pixel elements. The lens direct the rays such that portions of the rays incorporating biometric information of the iris may be locally spread or magnified over a larger number of pixel elements (e.g., relative to other portions of the rays), and the corresponding portions of the iris can be imaged with greater granularity. The local spreading results in non-uniform spreading or magnification of various portions of the iris that are captured in a single image. The positive distortion in the acquired image can be removed substantially or in whole, via image processing that use an inverse function of the positive distortion applied on the captured image.

In one aspect, this disclosure is directed to a system for acquiring a biometric image. The system can include a pixel array of a biometric camera. The pixel array can acquire an image of an iris using light reflected from the iris and transmitted through a lens of the biometric camera. The lens can be located between the pixel array and the iris, and can increase a pixels per iris (PPi) value of the image of the iris acquired by the pixel array, by applying optical positive distortion to the light transmitted through the lens when the light is directed through the lens. A processor can provide a biometric image for biometric matching, by image-processing the acquired image of the iris having the increased PPi value, with an inverse function of the optical positive distortion.

In some embodiments, the lens can optically direct light from a first portion of the iris to be incident on a greater number of pixels on the pixel array than light from a second portion of the iris, the second portion equivalent in area to the first portion. The lens can optically direct and spread the light from the iris to increase the PPi value of the image of the iris acquired by the pixel array. The lens can increase depth of field (DOF) of the biometric camera by optically directing the light from the iris. The processor can image-process the acquired image while retaining the PPi value. The processor can store the biometric image prior to using the biometric image for biometric matching. The processor can identify, in the acquired image, pixel locations containing iris biometric data. The processor can image-process the identified pixel locations using the inverse function of the optical positive distortion, and can skip the image-processing on other pixel locations. The biometric camera can be part of a mobile computing device. The lens can include or correspond to an asymmetric lens.

In another aspect, the present disclosure is directed to a system or method for acquiring a biometric image. A lens of a biometric camera can be positioned between a pixel array of the biometric camera and an iris. The pixel array can acquire an image of the iris using light reflected from the iris and transmitted through the lens of the biometric camera. The lens can increase a pixels per iris (PPi) value of the image of the iris acquired by the pixel array, by applying optical positive distortion to the light reflected from the iris when the light is optically directed through the lens. A processor can provide a biometric image for biometric matching, by image-processing the acquired image of the iris having the increased PPi value, with an inverse function of the optical positive distortion.

In some embodiments, the lens optically directs light from a first portion of the iris to be incident on a greater number of pixels on the pixel array than light from a second portion of the iris, the second portion equivalent in area to the first portion. The lens can optically direct and spread the light from the iris to increase the PPi value of the image of the iris acquired by the pixel array. The lens can increase depth of field (DOF) of the biometric camera by optically directing the light from the iris. A processor can image-process the acquired image while retaining the PPi value. The processor can store the biometric image prior to using the biometric image for biometric matching. The processor can identify, in the acquired image, pixel locations containing iris biometric data. The processor can image-process the identified pixel locations using the inverse function of the optical positive distortion, and can skip the image-processing on other pixel locations. The biometric camera can be part of a mobile computing device. The lens can include or correspond to an asymmetric lens.

In some aspects, the present disclosure is directed to a system for acquiring a biometric image. The system may include a pixel array of a biometric camera. The pixel array may be configured to acquire an image of an iris using light reflected from the iris and transmitted through a lens of the biometric camera. The system may include the lens, which may be located between the pixel array and the iris. The lens may be configured to optically direct the light from the iris when transmitted through the lens, to intentionally introduce positive distortion to the image of the iris that is acquired by the pixel array. The acquired image of the iris having the introduced positive distortion may be processed for use in biometric matching.

In some embodiments, the lens is configured to optically direct light from a first portion of the iris to be incident on a greater number of pixels on the pixel array than light from a second portion of the iris. The second portion may be equivalent in area to the first portion. In some embodiments, the lens is configured to optically direct the light from the iris to increase the number of pixels per iris (PPi) of the biometric camera. The lens may be configured to optically direct the light from the iris to increase depth of field (DOF) of the biometric camera.

In some embodiments, the system may further include a processor configured to process the acquired image to reverse the positive distortion. The processor may be configured to reverse the positive distortion prior to storing or using the image for biometric matching. The processor may be configured to identify, in the acquired image, pixel locations containing iris biometric data. The processor may be further configured to reverse the positive distortion on the identified pixel locations, and to ignore the positive distortion on some other pixel locations. In some embodiments, the biometric camera is part of a mobile computing device. The lens may comprise an asymmetric lens.

In certain aspects, the present disclosure is directed to a method for acquiring a biometric image. The method may include positioning a lens of a biometric camera between a pixel array of the biometric camera and an iris. The lens may optically direct light reflected from the iris when transmitted through the lens, to intentionally introduce positive distortion to an image of the iris to be acquired by the pixel array. The pixel array may acquire the image of the iris using the light transmitted through the lens, wherein the acquired image of the iris having the introduced positive distortion is processed for use in biometric matching.

In some embodiments, the lens may optically direct light from a first portion of the iris to be incident on a greater number of pixels on the pixel array than light from a second portion of the iris, the second portion equivalent in area to the first portion. The pixel array may optically direct the light reflected from the iris to increase the number of pixels per iris (PPi) of the biometric camera. The pixel array may optically direct the light to increase depth of field (DOF) of the biometric camera.

In certain embodiments, a processor processes the acquired image to reverse the positive distortion. The processor may process the acquired image to reverse the positive distortion prior to storing or using the image for biometric matching. The processor may identify, in the acquired image, pixel locations containing iris biometric data. The processor may reverse the positive distortion on the identified pixel locations, and ignore the positive distortion on some other pixel locations. In some embodiments, the biometric camera is part of a mobile computing device. The lens may comprise an asymmetric lens.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is a diagram illustrating a system for using positive distortion to acquire a biometric image, according to some embodiments;

FIGS. 2C and 2D depict example representations of grid lines of a rectilinear sensor array being mapped or projected backwards through a lens onto an area including both eyes, according to some embodiments;

FIG. 2E depicts an illustrative embodiment of a configuration giving rise to tangential distortion.

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for biometric acquisition using positive distortion.

A. Network and Computing Environment

Figure 1A:
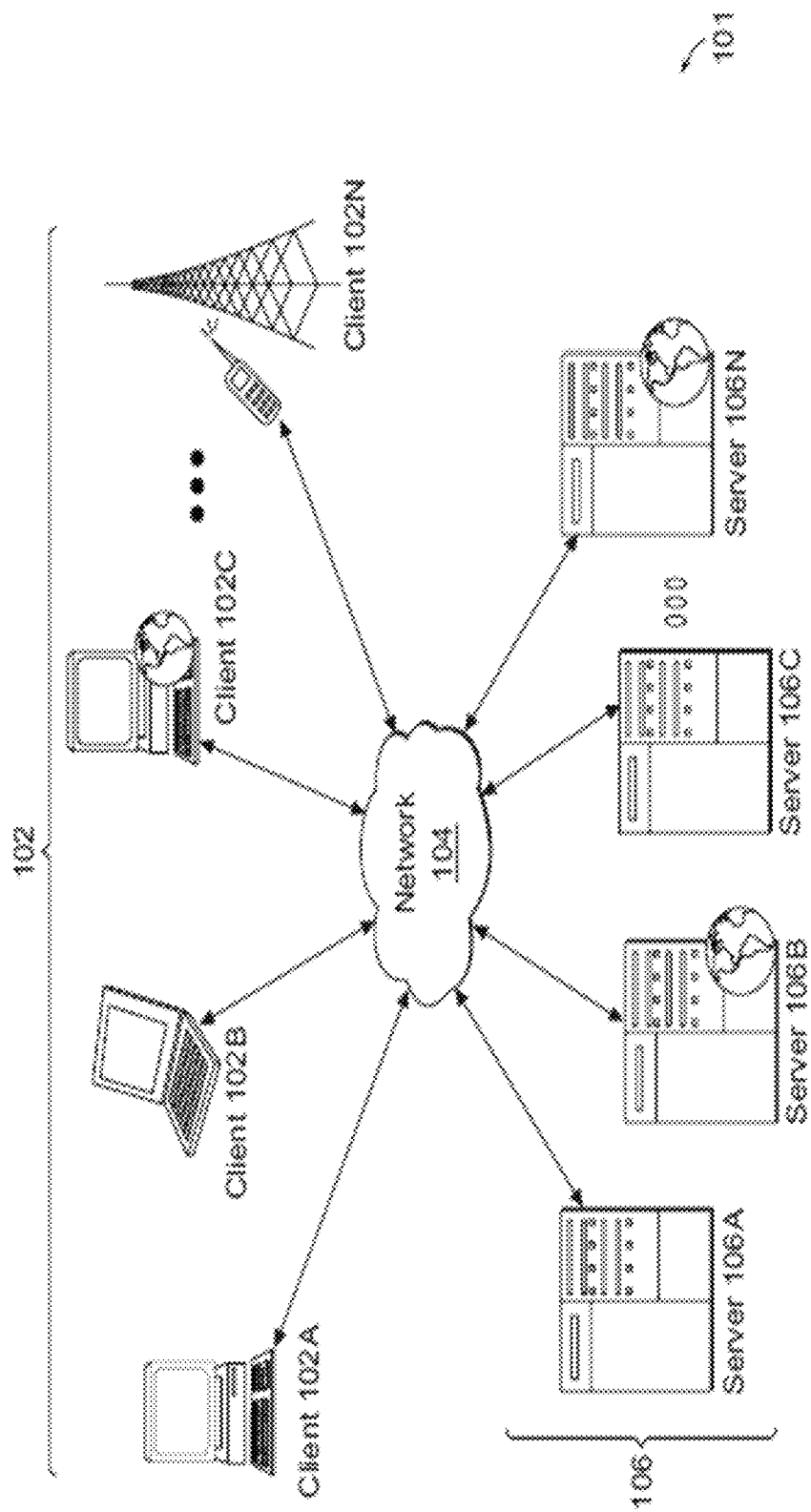
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network 104.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
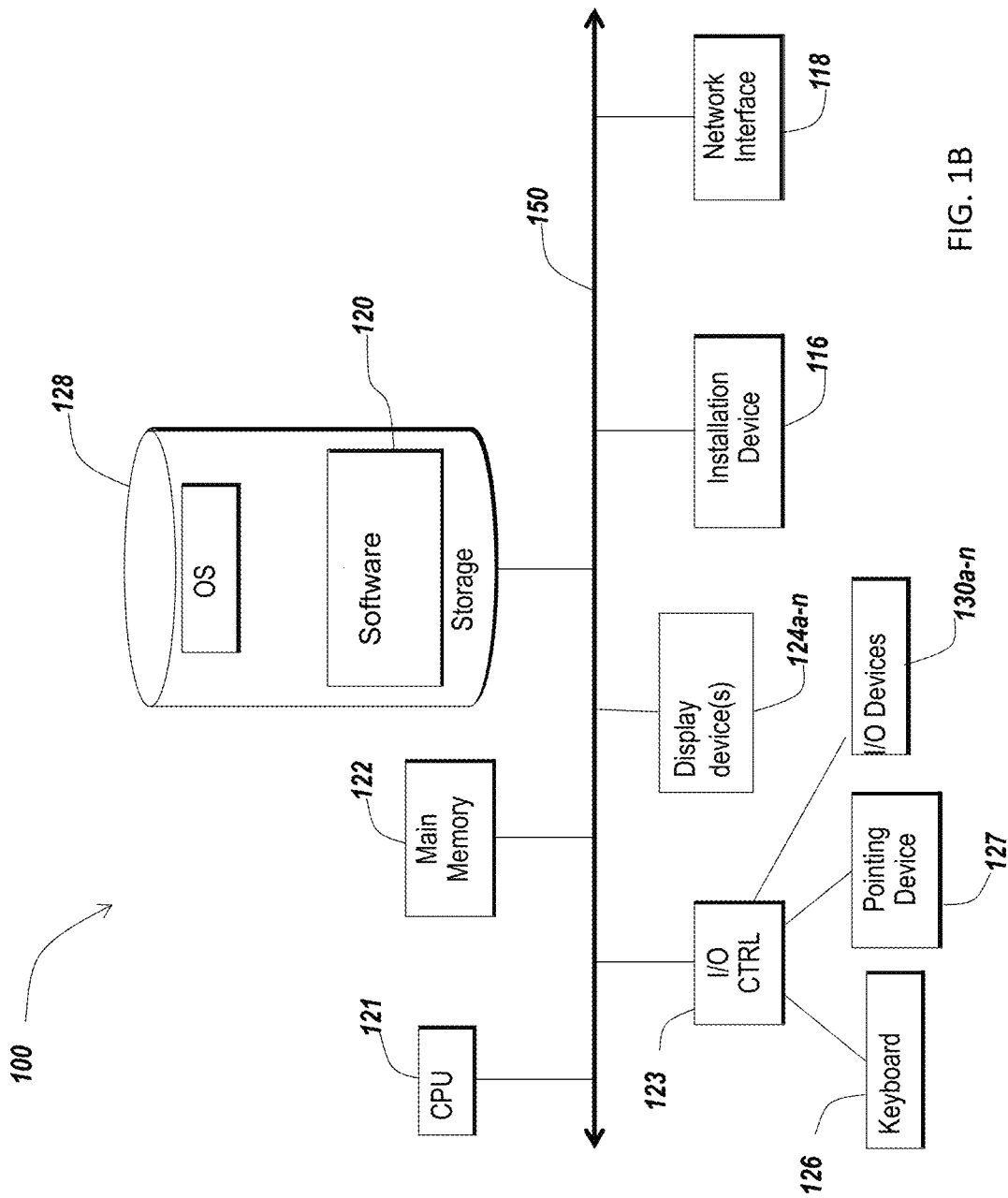
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, and software 120. The I/O controller 123, in some embodiments, is further connected to a key board 126, and a pointing device 127. Other embodiments may include an I/O controller 123 connected to more than one input/output device 130A-130N.

Figure 1C:
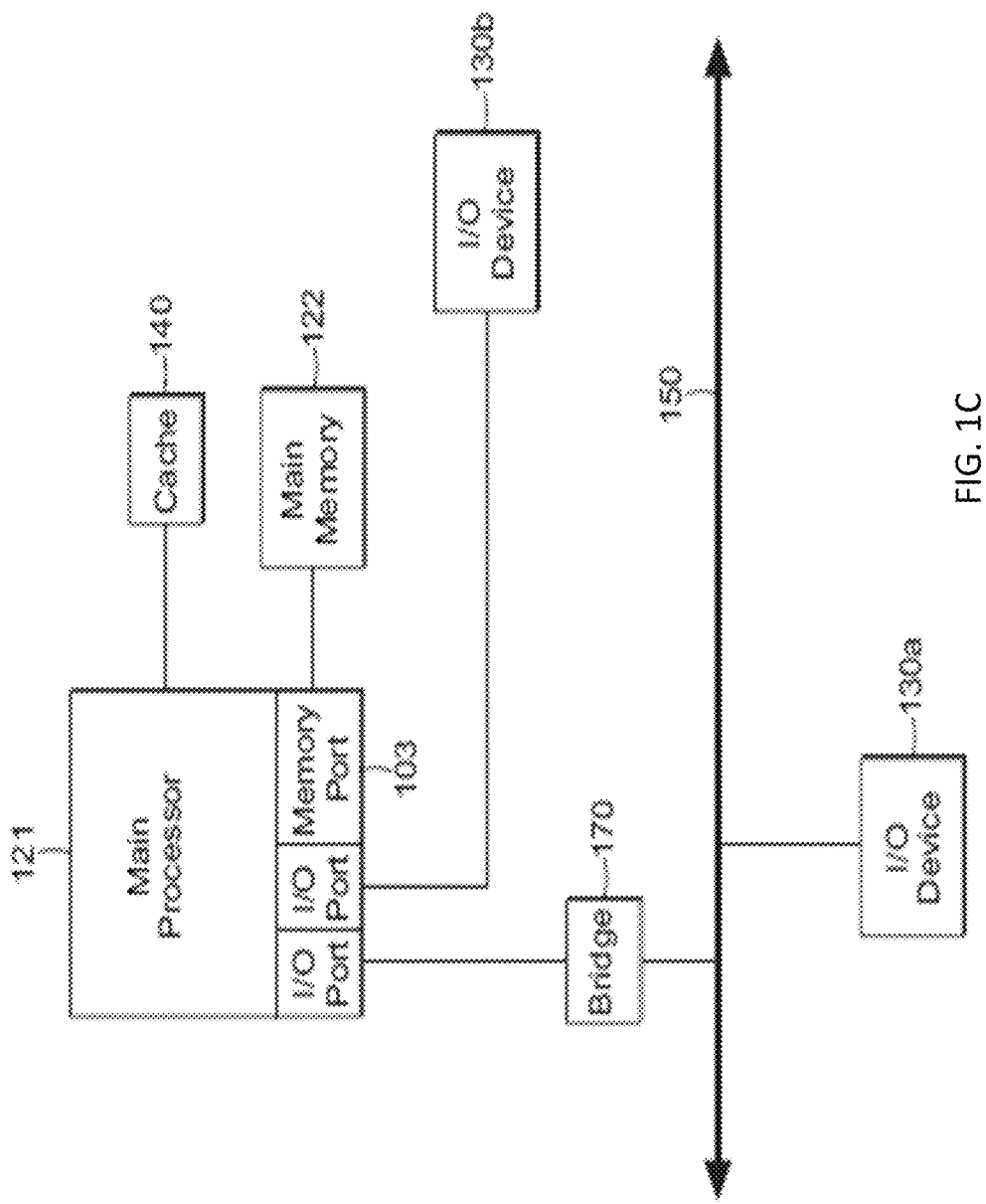

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

The computing device 100 can include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Using Positive Optical Distortion

Industry standard metrics of image quality can include color accuracy, image sharpness or modulation transfer function (MTF), and the level of noise for instance. An often unrecognized but important image quality metric is the level of scene distortion. Humans can easily detect a 5% distortion within an image. Optical designers therefore typically limit the amount of distortion introduced by an imaging system to be between ±3% for example. Some notable exceptions to this rule include wide field of view imaging devices, such as rear facing automobile back-up cameras and security cameras. These are special use cases that utilizes wide fields of view caused by the optically uncorrectable distortion. For mobile devices (e.g., cell phones, tablets) camera sector, it is helpful to standardize many of the digital image performance metrics. For instance, standardizing on the ±3% distortion range would help satisfy the discerning human eye. However, due to the ever-decreasing envelope constraints placed on cell phone cameras by cell phone manufacturers, designing camera lenses has become significantly more difficult especially when considering the thin cost margins stemming from the manufacturing yields of these difficult designs.

A recent new comer to the cell phone market, iris recognition cameras, has been given similar if not the same size and performance constraints of fitting within the ever-thinner profile of mobile devices such as cell phones. Primary performance metrics for iris recognition cameras may include the number of pixels per iris (PPi), and the ability to resolve this dimension and provide image sharpness (e.g., MTF). Distortion for iris recognition camera lenses, although not a metric driven by iris identification algorithmic performance, are often limited to the industry standard of ±3%. This distortion limit has been enforced or adopted for iris recognition cameras, even though the corresponding iris biometric images are not meant to be visually scrutinized by humans. A possible reason is that lens designers and/or manufacturing companies have developed a standard set of template designs that are typically used to begin any alternative design effort. These template designs have provided acceptable manufacturing yields, and are thus the favored starting designs for this reason. The lens design process can be separated for instance into two major categories: the first being the initial satisfaction of performance requirements as dictated by first order parameters. The second category, which is relatively more difficult and/or labor intensive, is the development effort from the initial design to a manufacturable design that has been rigorously adjusted through statistical analysis and/or manufacturing know-how to provide acceptable manufacturing yields. When developing a new design, starting with one of these previously design-for-manufacture templates is considered significantly lower risk than beginning a new design from scratch and is preferable to the designer. Without specific reasons to deviate from these templates, a designer may attempt to retain as many defined requirements within the template as possible.

Because iris recognition cameras are quite new to the mobile device or cell phone industry, the corresponding lens manufacturers may not have enough insight into the specific performance requirements placed on lens designers by iris recognition algorithms. Hence, recent iris cameras that have been developed, may have been generated from previously defined performance requirements gleaned from standard cell phone or other mobile device imaging cameras, one of these requirements being within ±3% distortion.

In some aspects, the present disclosure relates generally to apparatuses, systems and methods for biometric acquisition using positive optical distortion (sometimes referred as positive distortion). Certain embodiments of the present systems and methods introduce, use and/or amplify positive optical distortion in a lens (e.g., in one or more specific portions of the lens, at different level(s) of positive optical distortion relative to one or more other portions of the lens) that is part of an imaging device. The positive optical distortion introduced locally to one or more portions of the lens can be substantial, and can exceed 5%, 10%, 20%, 30% or 45% distortion level as some examples. The level of positive optical distortion introduced, incorporated and/or designed into the lens can range from 0% to 35% for instance. The lens may support a corresponding optical path for each of multiple light rays incident from a user (e.g., an iris of the user) that enter a camera system, such that the light rays are directed in a manner defined by the positive optical distortion, to an image sensor. For instance, and in some embodiments, the lens is manufactured as a solid piece of acrylic glass or other material with an entrance surface for incident rays to enter, and an exit surface for coupling the directed rays to an image sensor which comprises an array of sensor pixel elements.

The lens (e.g., via local shape and/or refractive index difference at particular portion(s), relative to adjacent portion(s) of the lens) can direct the rays such that portions of the rays incorporating biometric information of the iris may be locally stretched or magnified over a larger number of pixel elements (as compared to those without stretching or magnification), and the corresponding portions of the iris can be imaged with greater details, granularity or PPi value. As discussed herein, PPI can refer to the total number of pixel per inch (or pixel per unit length, or pixel per unit area) of iris biometric image data in an iris image, or number of image pixels describing an iris (or a defined portion of the iris). PPi can be a measure of an amount or density of biometric information contained in an image of a iris (or portion thereof). In some embodiments, the defined and/or known positive distortion introduced in the acquired image can be removed or reversed substantially or in whole, via image processing that uses an inverse function of the defined positive distortion, prior to using the image for biometric matching.

According to the inventive aspects discussed herein, this disclosure describes purposefully introducing, manipulating, controlling and/or increasing positive distortion within a lens design to increase PPi value of the camera system and hence increase the depth of field (DOF) and/or working distances (WD). The WD may be defined as a distance between the camera system (e.g., a lens or sensor array elements of the camera system) and an iris, that provides peak imaging performance or a peak MTF for certain predefined frequencies over a particular operation range. The DOF may be defined as a difference or range extending between a farthest and a closest WD between the camera system and the iris that produces images of quality above a predefined threshold to be accurately used for biometric matching or verification. The quality (of an image) pertains to the PPi (e.g., granularity) and/or the lens' ability to resolve pertinent and/or unique features or details of the iris at the minimum and maximum distances.

Referring now to FIG. 2A, an embodiment of a system for using positive distortion to acquire a biometric image is depicted. In brief overview, the system may include a lens 222 with positive distortion, an image sensor pixel array 223 for acquiring an image of an iris, and a processor 221 for performing image processing on the acquired image of the iris. The lens 222 may comprise one or more optical elements fabricated from any material such as acrylic or other types of glass or other material. For example, the lens can include multiple lenses (or optical elements) integrated together and/or disposed relative to one another in a physical configuration. The one or more optical elements may be arranged or integrated to form an optical assembly for directing rays of light. The lens may be shaped, designed, manufactured and/or configured to introduce positive distortion on an image formed from light rays directed through the lens 222. Positive distortion is sometimes referred as pin-cushion distortion, and may include stretching or distorting various portions of an associated shape or image to different extents. For example, portions of a region near or around at least some of the boundary segments of the region can be stretched more pronouncedly than other portions. The stretched portions can correspond to at least some parts of the annular region of an iris, thereby magnifying these parts of the iris (relative to the non-iris portions for instance). Positive distortion may be contrasted with negative distortion, which is sometimes referred to as barrel distortion.

Lights rays passing and/or directed through the lens 222 may be incident on an image sensor 223. The image sensor may include a sensor array of sensor pixels or photosensitive nodes 223, and may sometimes be referred to as an image sensor pixel array 223. The image sensor pixel array 223 may include one or more parallel rows and/or columns of sensor pixels or nodes arranged in a grid pattern for example. The image sensor pixel array 223 may detect incident light rays and/or acquire an image based on the incident light rays.

The lens 222 can positively distort an array of light rays from an iris in a defined manner. For example, the lens can stretch the array from a defined point or coordinates (e.g., at a center of the array of light rays or center of the iris within a corresponding pupil), so that the extent of stretching is increased further away from the defined point for instance. The lens 222 can stretch the array along one or more axes. For example, a rectangular or square array of rays can be stretched to a larger extent along one or both diagonal axes of the array. The lens 222 can stretch the array in a manner that rays from an iris are stretched to maximize their incidence and coverage over as many of the sensor pixels of an image sensor 223. As a non-limiting example, light from an annularly shaped iris can be stretched to be substantially rectangular in shape corresponding to the image sensor's sensor array, and captured by the sensor array to produce a substantially rectangular shaped iris image. Hence, most of the sensor pixels in the sensor array can be productively utilized to record biometric features of the iris, instead of features from other than the iris (which are biometrically insignificant or unimportant). In some embodiments, a particularly portion of the iris can be emphasized and accordingly stretched to maximize the PPi value on that portion of the iris when imaged.

In some embodiments, the lens 222 can introduce or apply negative distortion on one or more portions of an object (e.g., an eye) being imaged. For example, the lens 222 can use negative distortion to decrease PPi value for a non-biometric (e.g., pupil) portion of the object that is imaged so as to allow or allocate more sensor pixels to a biometric (e.g., iris) portion (which can be subject to positive distortion for instance).

The processor 221 may comprise embodiments of one or more features corresponding to the processor or CPU 121 as described above in connection with FIGS. 1B and 1C. The processor 221 may be implemented in hardware, or a combination of hardware and software, in one or more embodiments. For instance, the processor could include any application, program, library, script, task, service, process or any type and form of executable instructions executing on hardware (e.g., circuitry) of the system, in one or more embodiments. The processor may process or modify the acquired image, for instance, by performing a transformation or pixel-by-pixel translation of the acquired image. The processor may process or modify the acquired image by applying an inverse or cancellation function of the positive distortion introduced by the lens 222.

Figure 2B:
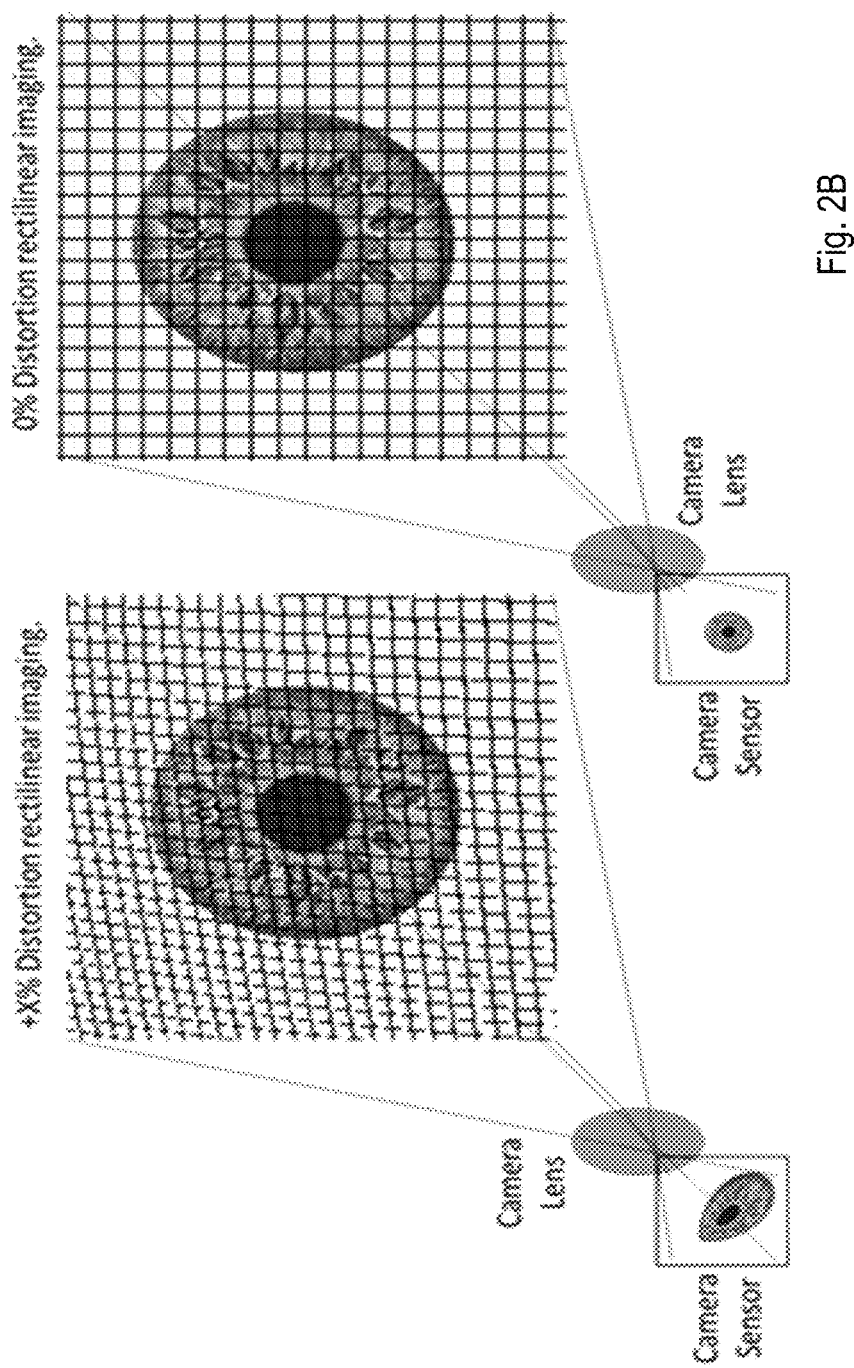
FIG. 2B depicts the effect of positive distortion on PPi of an acquired image of an iris.

Referring now to FIG. 2B, the effect of positive distortion on PPi value of an acquired image of an iris is illustrated. This example conceptually shows an "image" of a rectilinear sensor array being mapped or back-projected onto an iris, as transformed by the lens. The right portion of the figure shows sensor pixels that are mapped or "projected" onto the iris with 0% distortion from the lens, e.g., pixel grid pattern represented as perfect, undistorted square shapes overlaying the iris. The left portion of the figure shows the sensor's rectilinear pixel grid being mapped onto the iris with a lens having positive distortion (e.g., following conventional nomenclature). Both cases use the same sensor array. However, a denser number of grid lines or rectilinear pixels are packed into the same region/area of the eye being imaged (e.g., higher PPi value). The iris image acquired on the left portion of the figure would correspondingly be distorted, stretched and/or magnified such that its overall or effective PPi value is higher than that of the iris image acquired on the right portion through a lens with zero distortion. Such a change in the PPi value may be achieved even with lenses of the same focal length, because of the positive distortion designed into the lens used in the left portion of the figure.

Figure 2C:
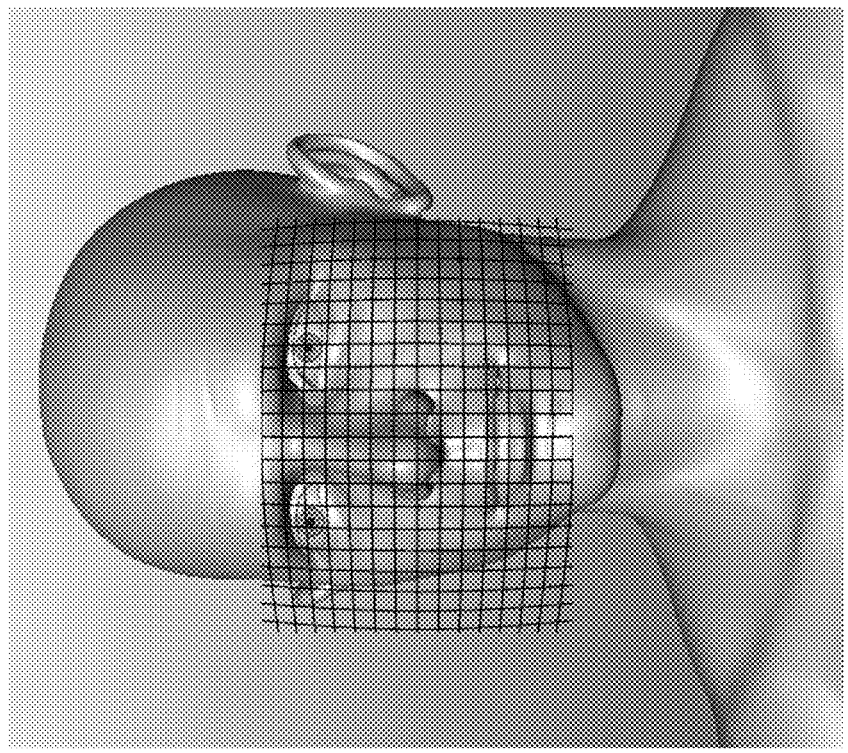

Referring now to FIGS. 2C and 2D, example representations of grid lines of a rectilinear sensor array being mapped or projected backwards through a lens onto an area including both eyes, are shown. In FIG. 2C for instance, a sensor's rectilinear grid which is representative of its pixel array, as transformed by a positive distortion lens, is back-projected onto a face. FIG. 2D shows grid lines that are more dense than those in FIG. 2C, mapped to a region that includes both eyes, to indicate how sensor pixels may be mapped to locations on and around both eyes. The lens may be designed and built to positively distort portions of an image where one or both eyes (or irises) are likely to be located (when the lens or camera system is suitably positioned relative to the subject for biometric acquisition), so as to locally increase the number of pixels mapped to each iris and increase the respective PPi value. In some embodiments, the pixel grid on the left portion of FIG. 2B represents a portion of the pixel grid around one of the eyes as shown in FIG. 2D.

In different embodiments of the lens, various types of distortion may be configured. One type or flavor of distortion is radial distortion. Radial distortion can center about an optical axis of the lens. On axis, radial distortion is zero. This on axis position usually corresponds to the center of the sensor. For instance, and referring again to FIG. 2D, the lens distortion may be configured to be radial, for the case where it is more likely that the eyes would not be centered in the image or field, but rather offset from the center of the image and sensor array. For a radial distortion lens, field positions are where the positive optical distortion takes place. It should be noted that although the grid lines are indicative of local concentrations or distribution of pixels mapped to various parts of a face, it may be difficult to show individual pixels on this scale.

Another type or flavor of distortion is tangential distortion. Tangential distortion can be useful for acquisition of biometrics, and the distortion may be restricted to only one axis. Tangential distortion refers to distortion that occurs due to angular tilting of the sensor plane relative to an optical axis of the camera lens system, for an object perpendicular to the optical axis. As seen in FIG. 2E which is illustrative of a configuration giving rise to tangential distortion, the pixels, as imaged onto an object (e.g., iris), have a finer sampling in the vertical direction than the horizontal. Due to the finer (or denser) sampling, PPi value is increased for an iris present in the top half of the image or tilted image plane. The Scheimpflug Principle describes the optical phenomenon of a tilted image plane relative to the imaging system's optical axis and the tilted conjugate object plane. The iris would remain in focus through the depth of field. The correction or reversal of tangential distortion can be performed by remapping pixels.

The lens (e.g., objective lens) of a camera system can include geometric distortion that can be described mathematically. For instance, to test or characterize the distortion introduced in an imaging camera, a reference checkerboard pattern can be imaged by the imaging camera, which would show the level(s) of distortion introduced to the image, and which can be used to calculate distortion correction coefficients. These distortion correction coefficients can be used to "undistort" or remap an image pixel by pixel so as to provide a true rectilinear representation of the object. The determination of geometric distortion is sometimes referred to as geometric camera calibration, or camera re-sectioning. This process can estimate the parameters of a lens and/or image sensor of a camera system. These parameters can be used to correct for lens distortion. To estimate the camera parameters, 3-D world points and their corresponding 2-D image points are obtained. These correspondences may be obtained using multiple images of a calibration pattern, such as a checkerboard. Using the correspondences, the camera parameters can be solved.

Beyond a certain level of distortion, such distortion can adversely affect the process of iris matching. To combat the adverse effects of distortion on iris recognition, image distortion-removal routines can be run on enrollment and authentication images for instance, to eliminate the effects of optical distortion as caused by the specific lens. This process can effectively normalize the enrollment (reference) iris images information as well as authentication iris images (e.g., into rectilinear grids) that can then be processed and compared. The effort of undistorting an entire image may be time consuming and impractical when high frames rates are needed. To limit the processing time of distortion removal for each iris image, techniques that locate the iris can be used to establish iris pixel locations and surrounding pixel patches that contain the entire iris information. By limiting the distortion removal routine to operate only on the very small iris patches within each image, processing time is significantly reduced.

Cell phone, computer, tablet and watch manufacturers for instance, are continually reducing the functional envelope requirements for camera size. For example, the vertical height (or thickness) of devices such as cell phones, tablets and computer screen enclosures has placed very challenging height limitations on all cameras. Iris recognition cameras are particularly affected by these requirements due to the need for high PPi values for security, and the minimum field of view requirements needed for customer ease of use. By using asymmetrical lens design for instance, off-axis imaging, manufacturing techniques, and nonlinear imaging methods, inducing positive distortion in the imager design (e.g., via the lens) can allow for shorter focal lengths while still retaining required PPi value in the field of view. Such lens are sometimes referred to as asymmetric lens, and can include an aspheric, partially aspheric or aspherical lens.

Figure 2F:
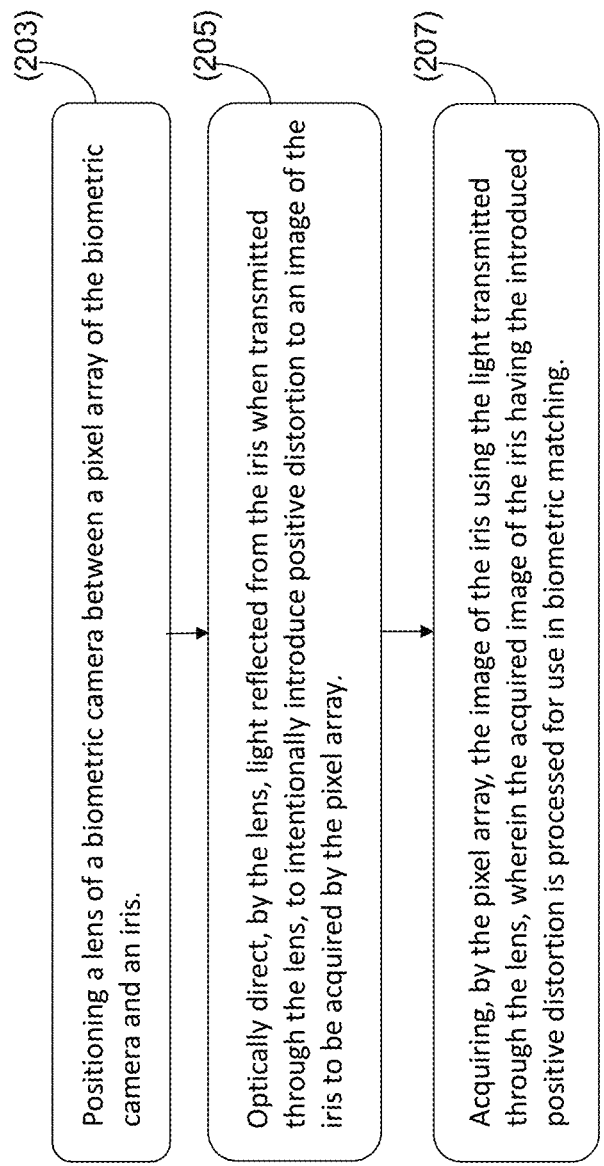
FIG. 2F is a flow diagram illustrating a method for acquiring a biometric image, according to some embodiments.

Referring now to FIG. 2F, one embodiment of a method for acquiring a biometric image is depicted. The method can include positioning a lens of a biometric camera between a pixel array of the biometric camera and an iris (201). The lens can optically direct light reflected from the iris when transmitted through the lens, to intentionally introduce positive distortion to an image of the iris to be acquired by the pixel array (203). The pixel array can acquire the image of the iris using the light transmitted through the lens, wherein the acquired image of the iris having the introduced positive distortion is processed for use in biometric matching (205).

Referring now to 201, and in some embodiments, a lens of a biometric camera is positioned between a pixel array of the biometric camera and an iris. In certain embodiments, the biometric camera is part of a mobile computing device, such as a smart phone. The lens may comprise an asymmetric lens (e.g., aspheric, partially aspheric or aspherical lens), to introduce (optical) positive distortion. A portion of the lens may introduce or induce (optical) positive distortion to at least a portion of the light rays reflected off the iris. Another portion of the lens may introduce or induce (optical) negative distortion to at least another portion of the light rays reflected off the iris. In one or more embodiments, the lens comprises one or more lenses configured, designed, shaped, tilted, manufactured, fabricated and/or implemented to introduce (optical) positive distortion to the light rays, which is translated into or captured as (image) positive distortion in at least a portion of an image being acquired.

Referring now to 203, and in some embodiments, the lens can optically direct light reflected from the iris when transmitted through the lens, to intentionally or purposefully introduce (image) positive distortion to at least a portion of an image of the iris captured, sensed or acquired by the pixel array. The lens can increase a pixels per iris (PPi) value (or number of pixels per iris) of the image of the iris acquired by the pixel array, by using the lens to apply optical positive distortion to the light reflected from the iris when the light is optically directed through the lens. The lens can optically shape, steer, stretch, magnify, spread or distort the volume of light reflected from the iris when transmitted and/or directed through the optical medium of the lens. For example, the lens can optically direct, shape, stretch and/or spread the light (e.g., light rays) reflected from a first portion of the iris, to be incident on a greater number of pixels on the pixel array than light (e.g., light rays) from a second portion of the iris, the second portion being equivalent in area to the first portion. The lens can optically direct, shape, steer, stretch, magnify, spread or distort the light (e.g., light rays) reflected from the iris to increase the number of pixels per iris of the biometric camera. The lens can optically shape, steer, stretch, magnify, spread or distort the light reflected from the iris, to increase depth of field (DOF) of the biometric camera.

Referring now to 205, and in some embodiments, the pixel array can acquire the image of the iris using the light rays transmitted (e.g., shaped, steered, stretched, magnified, spread or distorted) through the lens. The acquired image of the iris can include or incorporate (image) positive distortion in some portion(s) of the image (and can potentially include or incorporate negative distortion in certain other portion(s) of the image). Image positive distortion can describe or refer to an image representation of light from an object that has undergone optical positive distortion. Image negative distortion can describe or refer to an image representation of light from an object that has undergone optical negative distortion. The shape and appearance of an object in an image that exhibits or incorporates image positive (and/or negative) distortion, would appear to be visually distorted relative to the original shape and appearance of the object. The visual distortion would correspond to the extent of optical positive (and/or negative) distortion on the light from the object sensed or recorded by a camera that acquired the image.

The acquired image can be processed or image-processed for use in biometric matching. Image-processing can include pixel-based modification or manipulation on a digital image or pixels of an image (instead of optical modification or manipulation of light), and can include remapping or updating pixel locations, combining and/or splitting pixels and their values or information, and/or modifying pixel values for instance. A processor, such as an image processor, may process, image-process, modify or otherwise adjust the acquired image to reverse, remove or nullify the image positive distortion, while retaining the increased PPi value (enabled by the optical positive distortion effects of capturing an amount of iris biometrics using a larger number of sensor pixels) for instance. The processor can image-process the acquired image (having the image positive distortion), with or using an inverse function of the optical positive distortion, to reverse, remove or nullify the image positive distortion, while retaining or maintaining the increased PPi value.

The reversal or removal of the image positive distortion includes or corresponds to an image-processing process (e.g., moving or relocating pixel locations within the image) and is not an optical process to steer, shape or direct light rays. The reversal or removal of the image positive distortion can include image-processing using an inverse function of the optical positive distortion. The inverse function of the optical positive distortion can include moving, relocating, shifting and/or combining pixels such that imagery formed by the inverse function would visually appear to be substantially the same as the appearance of the source object (e.g., iris) of the imagery. For instance, whereas optical positive distortion spreads or directs light over a larger area of the pixel arrays that includes a correspondingly higher number of sensor pixels, image-processing using the inverse function of the optical positive distortion can spatially compress or direct a number of image pixels (e.g., corresponding to the sensor pixels) closer together within a smaller area in an image, in order to reverse the visual effect resulting from the optical spreading of the light. When the greater PPi value is achieved for an iris image (enabled by the optical positive distortion of the lens), reversing the image positive distortion on the iris image can include packing, moving and/or mapping certain image pixels into a smaller physical image area, which maintains the PPi value (e.g., because image pixels are not deleted or removed). In some embodiments, the PPi value can be reduced (e.g., to a small extent, but higher in value as compared to a camera system that does not employ optical positive distortion) if some pixels are combined within an image during image-processing.

The processor may process the acquired image to reverse or eliminate the positive distortion in whole or in part, to produce a biometric image, prior to storing the biometric image, and/or using the biometric image for biometric matching (e.g., after storing the biometric image). In some embodiments, the (image positive distortion) reversal/removal process can include the processor identifying in the acquired image, pixel locations containing iris biometric data (and/or pixel locations not containing iris biometric data). The processor may reverse the image positive distortion on the identified pixel locations (corresponding to biometric information), and ignore the image positive distortion (or other types of distortion, or absence of distortion) on some other pixel locations (e.g., that do not include biometric information). This can reduce the amount of image-processing, thereby conserving resources and reducing power consumption.

The same process of introducing (optical) positive distortion can be performed to produce an image (with image positive distortion) and then removing the image positive distortion from the image, so as to produce an enrolled iris image (or enrollment image). The enrolled iris image can appear to be essentially visually undistorted (e.g., relative to the original appearance of the corresponding iris), and having a higher PPi value relative to an image obtained without being subject to optical positive distortion by the lens. The enrolled iris image can be used as a reference for matching or comparing against other iris images in attempts to biometrically authenticate against the reference. The same process of introducing optical positive distortion can be performed on any (e.g., subsequent) iris image acquired for matching or comparing against the reference (sometimes referred to as an authentication image). An acquired (positively-distorted) image can similarly be subject to the removal of image positive distortion in the acquired image, to produce an essentially (visually) undistorted image with higher PPi (relative to an image obtained without being subject to optical positive distortion by the lens), for comparison against the reference. In some embodiments, the processor can execute image distortion removal routines on enrollment and authentication images for instance to remove or reduce distortion.

It should be noted that certain passages of this disclosure can reference terms such as "first" and "second" in connection with devices, portions, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A system for acquiring a biometric image, the system comprising:
   a pixel array of a biometric camera, the pixel array configured to acquire an image of an iris using light reflected from the iris and transmitted through a lens of the biometric camera; and
   the lens, located between the pixel array and the iris, configured to intentionally increase a pixels per iris (PPi) value of the image of the iris acquired by the pixel array, by applying optical positive distortion to the light transmitted through the lens when the light is directed through the lens, to stretch a portion of the light with an annular or circular shape corresponding to the iris, into a shape that aligns closer to a rectangular shape of the pixel array; and
   a processor configured to provide a biometric image for biometric matching, by image-processing the acquired image of the iris having the intentionally increased PPi value, with an inverse function of the optical positive distortion, comprising:
   identifying, in the acquired image, pixel locations containing iris biometric data; and
   reversing effects of the optical positive distortion on the identified pixel locations containing iris biometric data while maintaining the intentionally increased PPI value of the acquired image and ignoring the effects of the optical positive distortion on pixel locations without iris biometric data.

2. The system of claim 1, wherein the lens is configured to optically direct light from a first portion of the iris to be incident on a greater number of pixels on the pixel array than light from a second portion of the iris, the second portion equivalent in area to the first portion.

3. The system of claim 1, wherein the lens is configured to optically direct and spread the light from the iris to increase the PPi value of the image of the iris acquired by the pixel array.

4. The system of claim 1, wherein the lens is configured to increase depth of field (DOF) of the biometric camera by applying the optical positive distortion to the light from the iris.

5. The system of claim 1, wherein the processor is configured to image-process the acquired image while retaining the PPi value.

6. The system of claim 5, wherein the processor is configured to store the biometric image prior to using the biometric image for biometric matching.

7. The system of claim 1, wherein the processor is further configured to image-process the identified pixel locations using the inverse function of the optical positive distortion, and to skip the image-processing on other pixel locations.

8. The system of claim 1, wherein the biometric camera is part of a mobile computing device.

9. The method of claim 8, wherein the biometric camera is part of a mobile computing device.

10. The system of claim 1, wherein the lens comprises an asymmetric lens.

11. A method for acquiring a biometric image, the method comprising:
    positioning a lens of a biometric camera between a pixel array of the biometric camera and an iris;
    acquiring, by the pixel array, an image of the iris using light reflected from the iris and transmitted through the lens of the biometric camera;
    intentionally increasing a pixels per iris (PPi) value of the image of the iris acquired by the pixel array, by using the lens to apply optical positive distortion to the light reflected from the iris when the light is optically directed through the lens, to stretch a portion of the light with an annular or circular shape corresponding to the iris, into a shape that aligns closer to a rectangular shape of the pixel array; and
    providing a biometric image for biometric matching, by image-processing the acquired image of the iris having the increased PPi value, with an inverse function of the optical positive distortion, comprising:
    identifying, in the acquired image, pixel locations containing iris biometric data; and
    reversing effects of the optical positive distortion on the identified pixel locations containing iris biometric data while maintaining the intentionally increased PPI value of the acquired image and ignoring the effects of the optical positive distortion on pixel locations without iris biometric data.

12. The method of claim 11, further comprising optically directing, by the lens, light from a first portion of the iris to be incident on a greater number of pixels on the pixel array than light from a second portion of the iris, the second portion equivalent in area to the first portion.

13. The method of claim 11, further comprising optically directing and spreading, by the lens, the light from the iris to increase the PPi value of the image of the iris acquired by the pixel array.

14. The method of claim 11, further comprising increasing depth of field (DOF) of the biometric camera by using the lens to apply the optical positive distortion to the light from the iris.

15. The method of claim 11, comprising image-processing the acquired image while retaining the PPi value.

16. The method of claim 15, further comprising storing the biometric image prior to using the biometric image for biometric matching.

17. The method of claim 11, comprising image-processing the identified pixel locations using the inverse function of the optical positive distortion, and skipping the image-processing on other pixel locations.

18. The method of claim 11, wherein the lens comprises an asymmetric lens.

* * * * *